*E. Andrews,*
*Grinding Saws.*

N° 16,782. Patented Mar. 10, 1857.

UNITED STATES PATENT OFFICE.

EMANUEL ANDREWS, OF ELMIRA, NEW YORK.

MACHINE FOR GRINDING SAWS.

Specification of Letters Patent No. 16,782, dated March 10, 1857.

*To all whom it may concern:*

Be it known that I, EMANUEL ANDREWS, of Elmira, in the county of Chemung and State of New York, have invented a new and useful Machine for Grinding Circular Saws; and I do hereby declare that the following is a full and exact description thereof, reference being had to the accompanying drawings and to the letters of reference marked thereon.

To enable others skilled in the art, to make and use my invention, I will proceed to describe its construction and operation.

The nature of my invention consists in the use of two stones in combination with the rollers for the purpose of grinding on a taper, each stone acting independent of the other, the saw revolving faster when the stones are at, or nearer the center, than when at the edge of the same; as hereinafter described.

Figure 3:
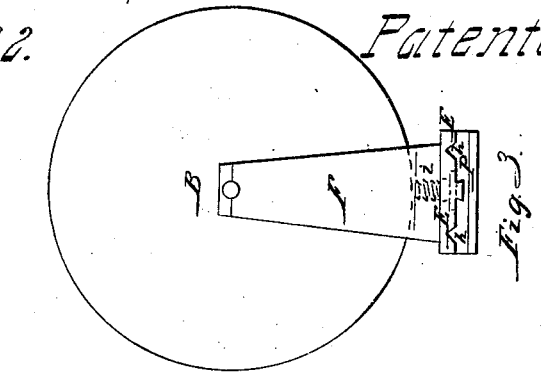
Figure 2:
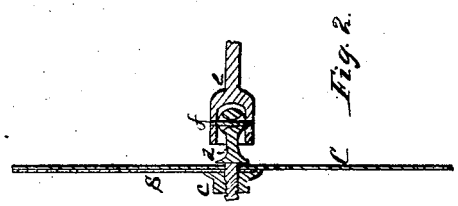
Figure 1:
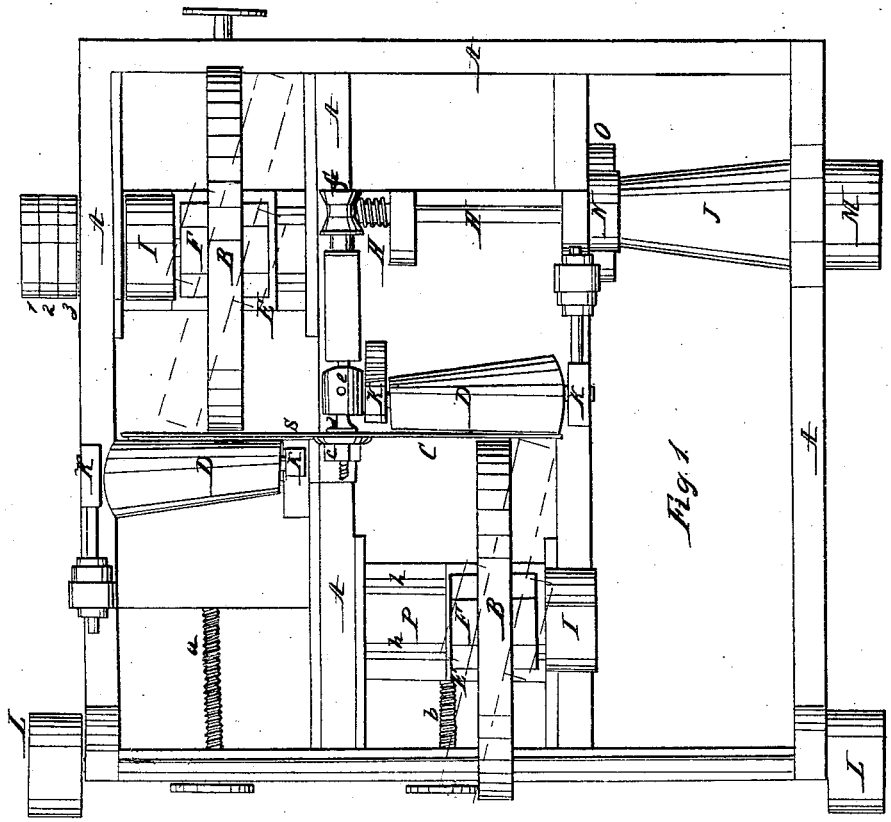

Figure 1, is a plan view. Fig. 2 is a section of the ball joint, and saw mandrel with saw attached. Fig. 3, is a view of one of the stones, with screw, shown by red lines.

In the Fig. 1, A, the frame or base of the machine—B, the stones, C, the saw—D, the rollers—E, the sliding ways on which the pivot boxes stand—F, the pivot boxes—G, the double cone geared wheel on the end of the saw mandrel in which the worm screw on shaft H works—I, pulley on the end of shaft on which the stone is hung—J, conical pulley—K, the bearings for the ends of rollers D—L, pulleys on the end of shaft extending across the machine, M, pulley on the end of conical pulley J—1, 2, 3 pulleys on the screw for traversing the stone B—N, pulley on the inner end of conical pulley—O, pulley on the shaft H, on which is the worm screw—P, the sliding way on which is seated the pivot box—(*a*) screw for adjusting the stone to the saw—(*b*) the screw for adjusting the roller D to the saw—(*c*) the nut for fastening the saw on the mandrel—(*d*) the end of the mandrel with ball jointhead—(*e*) the end of the shaft or mandrel, with socket into which the ball fits and operates.

In Fig. 2, C, the saw—(*c*) the screw—(*d*) the end of the mandrel with ball joint. (*e*) the end of the shaft with socket into which the end of the mandrel fits. *f*, the pin for fastening the ball joint head into the socket—(*g*) the plate to assist in grinding hard places.

In Fig. 3, B, the stone. F, the pivot boxes. P, the sliding ways—(*i*), the screw on which box F, revolves.

The saw being secured in proper position rotary motion is communicated to conical pulley J, in any convenient manner: pulleys O, and N, are connected by means of a belt, pulley O, being connected to the conical pulley and pulley N connected to the worm as shown in Fig. 1, said worm gearing into the double cone geared wheel G on the end of the saw mandrel as described, thus imparting circular motion to the saw. Pulley J, being conical, and immediately connected to the driving power by a belt, said belt being caused to traverse back and forth on said conical pulley, by any convenient means, and kept tight by any common tightener placed between the pulleys, and increasing and decreasing motion is imparted to the saw, the traverse motion of said belt on said saw being so timed as to cause the saw to revolve more rapidly when the stone is at the center than at the circumference of the saw, thus grinding the saw to a gradual taper from the center to the circumference. The ball joint as shown in Fig. 2, by means of which the saw is connected to the devices for giving it rotary motion, as described, is designed to allow the saw to accommodate itself between the rollers, and the stones, and thus equalize the pressure on all parts, as desired. The stones receive motion from belts, directly from the driving power.

At the time that the operation of grinding is commenced, the stone may be positioned at, or near the center of the saw and be gradually drawn toward the periphery, or cutting edge of the saw, or it may be placed at the periphery, and gradually moved inward toward the center, by means of a screw which passes through a tap secured in the base of the adjustable stone pivot box, said screw is operated in opposite directions at will, by means of two belts, one cross, and one straight which pass around pulley L, and operate alternately on pulley 2 which is stationarily secured to the screw. Pulleys 1, and 3, being loose on the barrel of the screw, for the purpose of receiving the belts when their action is not desired to operate the stone. A similar device is applied to the additional stone.

The stones may be turned on the pivot in the base of their supports, or bearers to the position shown by red lines in Fig. 1, to enable me to use the corner of the stone which answers a better purpose in grinding than the entire flat surface.

By making the stones independent of each other, I am enabled to place a piece of sheet iron as shown at (g) Fig. 2, and secure the same to the mandrel of the saw next to the thickest part, or where the saw is hard, and only one stone is made to operate on the saw, the other is moved away so as not to grind away the sheet iron plate; this iron plate by passing between the roller and the saw increases the pressure on the thickest part of the saw without grinding the thin thus I am enabled to balance the saw perfectly.

Having thus fully described the construction and operation of my invention what I claim as new and desire to secure by Letters Patent is—

1. Connecting the saw to the mandrel by the ball joint, for the purpose of adjusting it to the portion of the rollers while being operated on by the stones, whether these act conjointly or independently, and to prevent straining the saw, as specified.

2. The plate (g) for the purpose of allowing me to guide and grind a saw even in thickness regardless of its hard or soft parts, thus perfectly balancing the saw as herein set forth and described.

EMANUEL ANDREWS.

Witnesses:
HEMAN N. COMSTOCK,
W. H. ANDREWS.